Feb. 25, 1964 W. W. BOGUE 3,122,230
TRANSFER APPARATUS FOR BOOKS
Filed Nov. 29, 1960 7 Sheets-Sheet 6

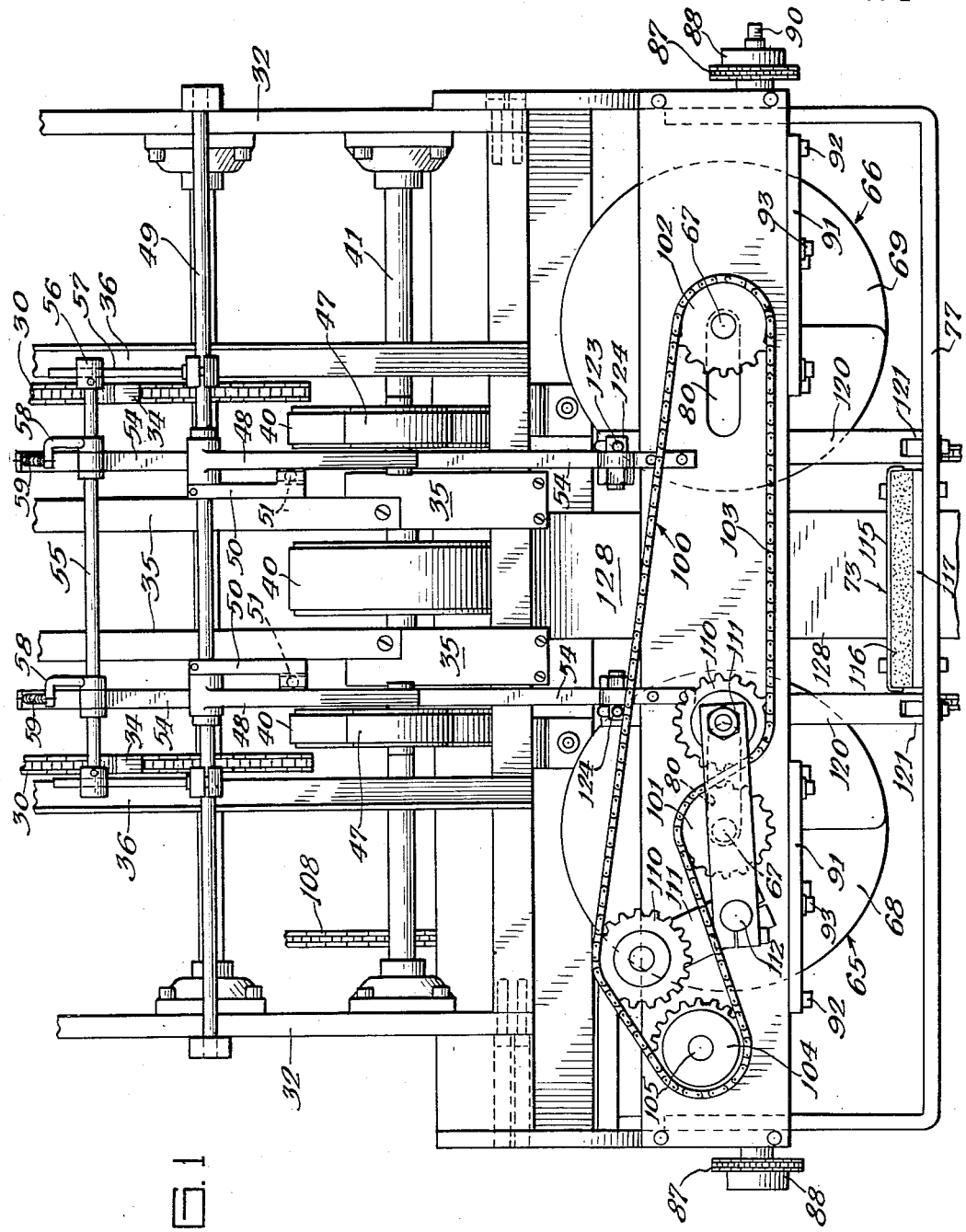

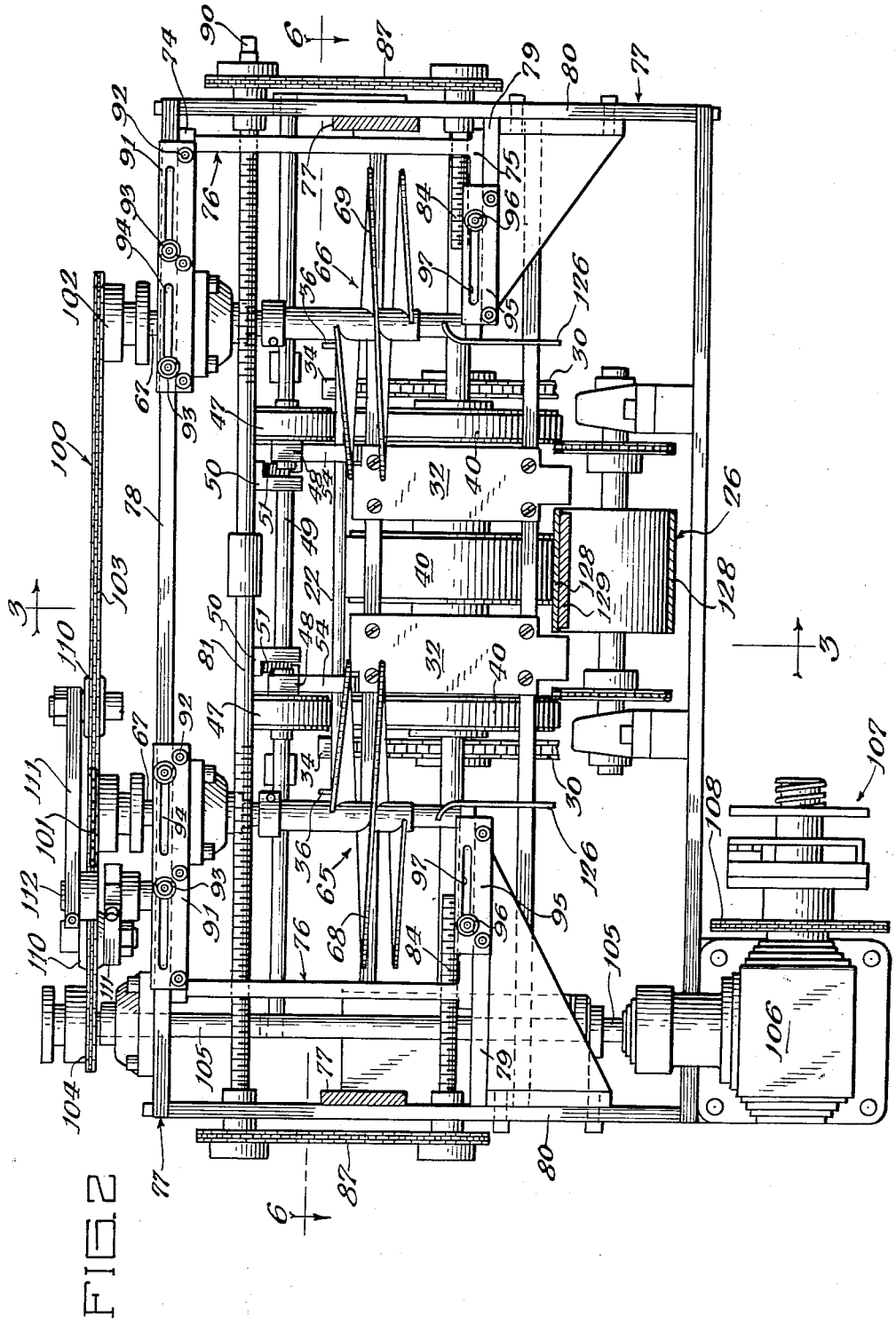

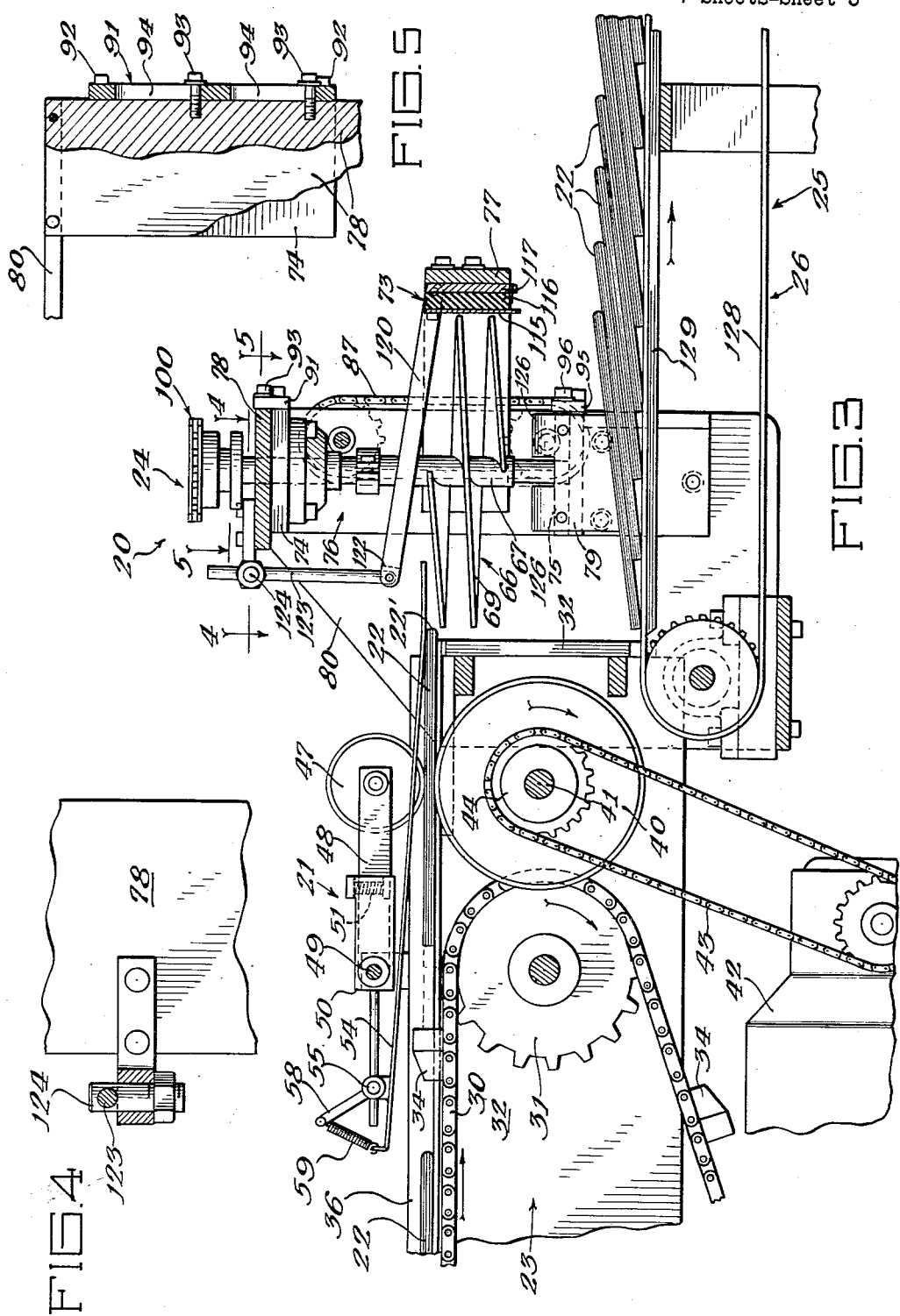

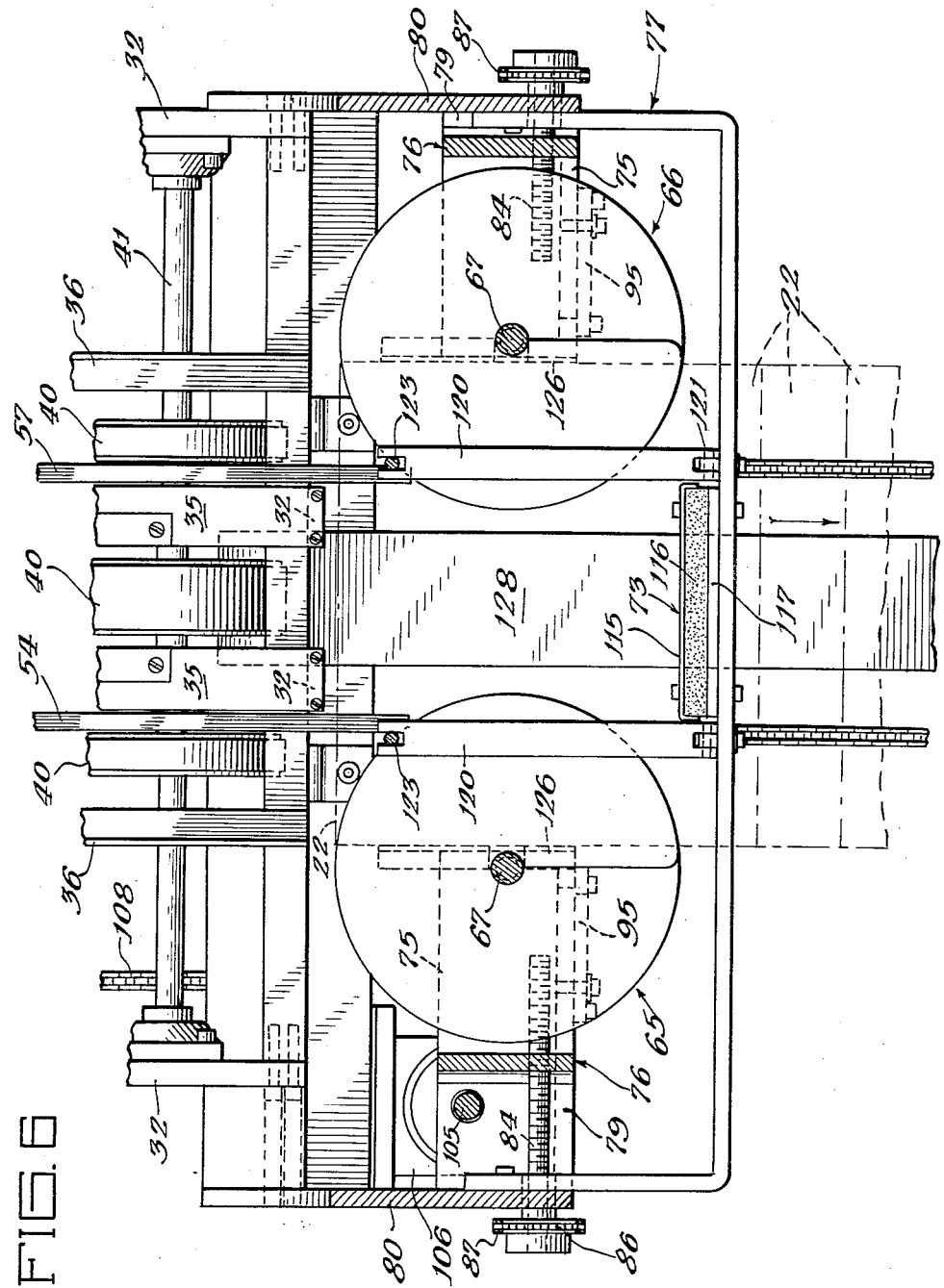

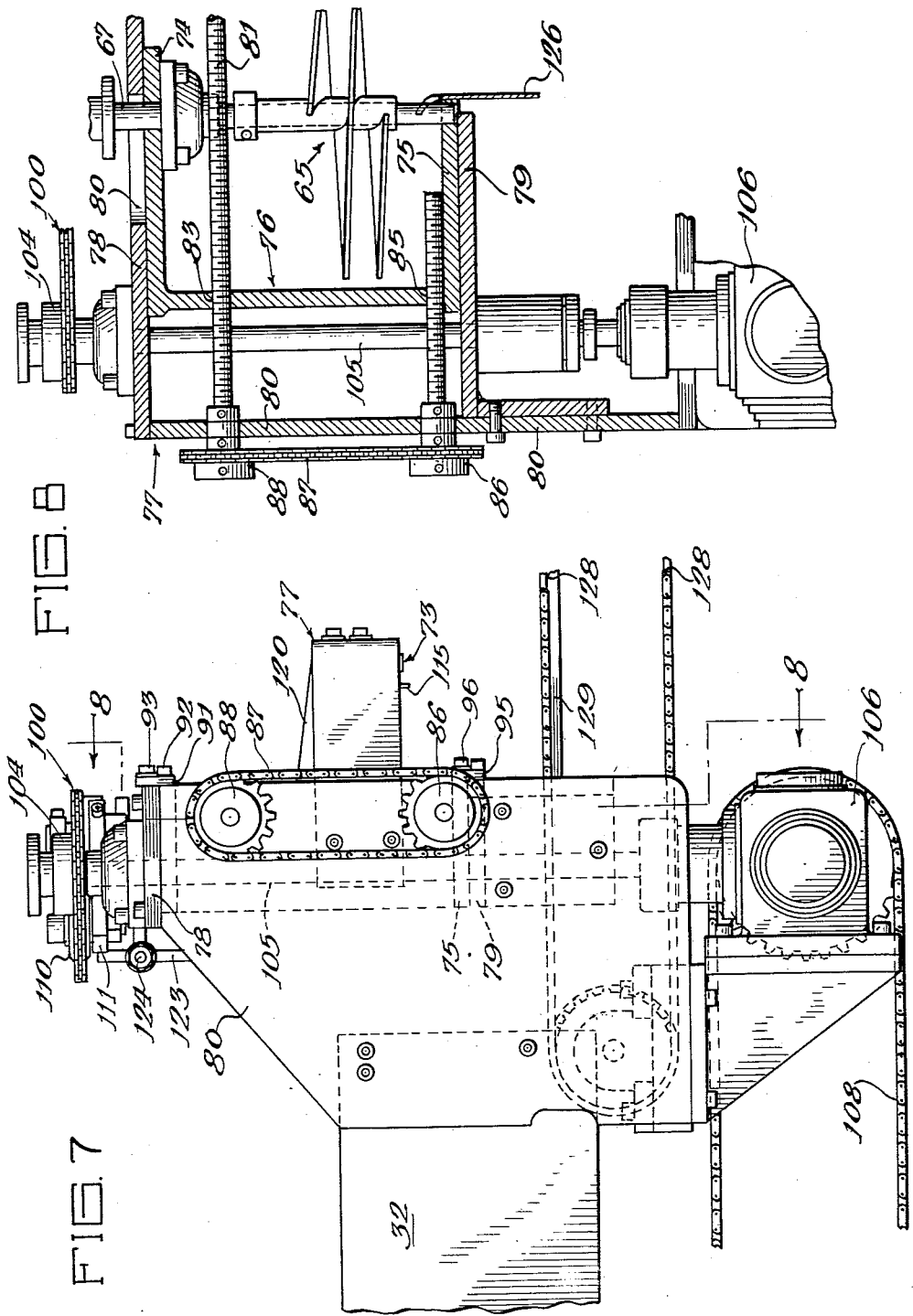

Feb. 25, 1964 W. W. BOGUE 3,122,230
TRANSFER APPARATUS FOR BOOKS
Filed Nov. 29, 1960 7 Sheets-Sheet 7

United States Patent Office 3,122,230
Patented Feb. 25, 1964

3,122,230
TRANSFER APPARATUS FOR BOOKS
Wilbur W. Bogue, Homewood, Ill., assignor to R. R. Donnelley & Sons Company, a corporation of Delaware
Filed Nov. 29, 1960, Ser. No. 72,380
7 Claims. (Cl. 198—35)

This invention relates to a transfer device, and more particularly to an apparatus for vertically transferring books.

In mass handling of books, such as signatures, magazines, catalogues, cased books and the like, it is common practice to stack the books or to arrange the books with their edges in overlapping relationship, as on a conveyor belt. Books such as magazines and catalogues are often sent through the mails with an address label adhesively secured to the cover. The labels are usually machine applied and subsequent oversliding of the books may remove or damage some of the freshly applied labels. For example, such oversliding may occur as the book passes from a generally horizontal conveyor belt and falls in stacked relationship on a suitable bed. Similar difficulties may occur whenever a book is discharged from a conveyor belt or similar transferring apparatus and is permitted to fall freely, as into a mail bag, because the book is likely to become inclined and to move horizontally during the fall, and therefore oversliding of the covers can be expected. Oversliding may also tend to score or otherwise mar the book cover. Certain novel practices which are particularly prevalent in the preparation of popular magazines, such as providing a small decorative flap loosely overlying a portion of the cover, are further deterrents to handling operations involving oversliding. Another difficulty which may be encountered is that during any free fall of a book, the book may open partially and the leaves may flutter and be damaged.

A principal object of the invention, therefore, is to provide a new and improved transfer apparatus.

Another object of the invention is to provide a new and improved vertical transfer apparatus for retarding oversliding of books. As used herein the word "books" includes case bound books, catalogues, magazines, pamphlets, and like material.

A further object of the invention is the provision of an apparatus for transferring books wherein a pair of juxtaposed helices rotate on upright axes and serially receive books on adjacent upper portions of helical webs, for individually and gently moving the books downwardly and discharging the books from lower portions of the spirals while retarding horizontal movement of the books so that upon discharge of the books they are level and fall directly downwardly.

The invention is illustrated in a preferred embodiment in the accompanying drawings in which:

FIGURE 1 is a plan view of an apparatus embodying the invention, with portions of an infeed conveyor and a receiving device broken away;

FIGURE 2 is a rear elevational view of the apparatus with parts broken away for clarity of illustration;

FIGURE 3 is a section taken substantially as illustrated along the line 3—3 of FIGURE 2;

FIGURE 4 is a section taken substantially as illustrated along the line 4—4 of FIGURE 3;

FIGURE 5 is a fragmentary section taken substantially as illustrated along the line 5—5 of FIGURE 3;

FIGURE 6 is a section taken substantially as illustrated along the line 6—6 of FIGURE 2;

FIGURE 7 is a side elevational view of the apparatus;

FIGURE 8 is a fragmentary section taken substantially as illustrated along the line 8—8 of FIGURE 7;

Figure 9:
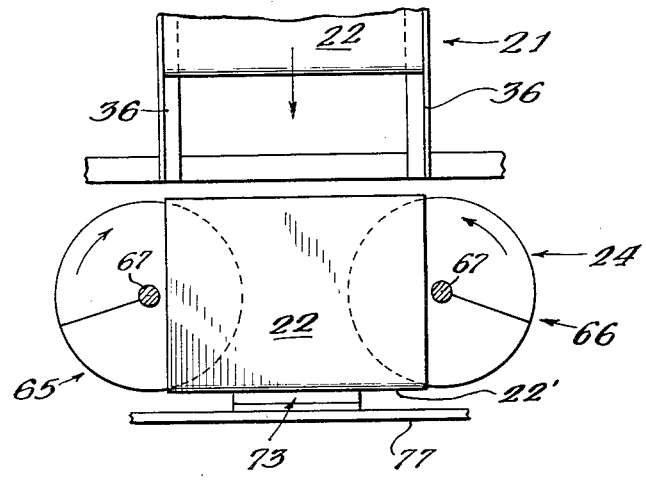
FIGURES 9–11 are diagrammatic plan views of a portion of the transfer apparatus, illustrating three stages in moving a book vertically through the apparatus, with certain parts broken away for clarity of illustration.

The invention is, in brief, directed to an apparatus for vertically transferring books. A feed device horizontally and individually projects books onto upper adjacent portions of helical webs of rotating juxtaposed spirals, and against a vertical abutment for stopping horizontal movement of the books. As the spirals rotate each book is individually lowered and is lightly urged against the vertical abutment until after the book has been released from the lower portion of the webs whereupon the book falls directly downwardly in a flat position to avoid any oversliding of the books and to retard any tendency of the books to open. After being discharged from the spirals the books may fall onto a suitable receiving device.

Referring to the drawings, a transfer apparatus 20 has infeed means in the form of a horizontal friction feed device 21 receiving books 22, which may take the form of signatures, magazines, catalogues, cased books, or the like, from a lugged chain conveyor 23, and horizontally and individually projecting each horizontally positioned book into an upper portion of a vertical transfer device 24. The transfer device individually and gently moves the books to a lower portion thereof and discharges the books directly downwardly onto a suitable receiving device 25, for example an outfeed belt conveyor 26.

The lugged feed chain conveyor 23 includes a pair of chains 30 each received on a follower sprocket 31 fixed to a shaft which is rotatably mounted in a suitable frame 32. The chains 30 are driven in any suitable manner, as by an electric motor (not shown), and each chain has a lug of each of a plurality of spaced pairs of lugs 34, each pair of lugs engaging a book 22, having a leading bound edge 22', for moving the book across inner guides 35 and side guides 36 and into the friction feed device 21.

The friction feed device 21 has three driven friction rollers 40 each fixed to a shaft 41. The shaft 41 is rotatably mounted on the frame 32 and driven in any suitable manner as by an electric motor 42 and a suitable chain drive 43 including a sprocket 44 fixed to the shaft 41. A pair of small follower friction rollers 47 overlie the outer driven friction rollers 40 and are suitably journalled on the free ends of supporting levers 48 which are rotatably mounted on a shaft 49 fixedly mounted at opposite ends on the frame 32. Inwardly of the supporting levers 48 are a pair of stub levers 50 each fixed to the shaft 49. Springs 51 are received between cooperating flanges on adjacent supporting levers 48 and stub levers 50 so that the follower friction rollers 47 are resiliently urged into engagement with the top surface of each book 22. A pair of hold-down bars 54 each has a boss intermediate its ends pivotally connected to a floating shaft 55 which is fixed at its ends to sleeve members 56 each receiving a rod 57 fixed at one end to the shaft 49. Also fixed to the floating shaft 55 are a pair of levers 58. Tension springs 59 have opposite ends secured to an end of a hold-down bar 54 and the free end of an adjacent lever 58 for constantly urging the hold-down bar against a book 22 received between the hold-down bars 54 and the adjacent driven friction rollers 40. The hold-down bars 54 maintain mild pressure on the top surface of each book 22 for holding the trailing edge of the book and preventing it from kicking up or rebounding upon engaging the abutment 73. Each book is horizontally guided into the upper portion of the vertical transfer device 24 by the adjacent ends of the hold-down bars 54 atop the book and the guides 35 and 36 under the book. The driven friction rollers 40 are rotated sufficiently rapidly so that as a book 22 is received between the friction rollers 40 and 47, it is drawn away from the delivering pair of lugs 34 and is horizontally projected into the vertical transfer device 24.

The vertical transfer device 24 includes means for individually moving the books from the upper portion to the lower portion of the transfer device and for individually discharging the books directly downwardly from the lower portion, in the form of a pair of co-extensive, open ended spirals 65 and 66, each having an upright shaft 67 defining a substantially upright axis. The spiral 65 has a web 68 and the spiral 66 has a web 69. Both webs 68 and 69 are preferably helical and have a plurality of convolutions with the same gradual and opposite pitch substantially concentric with their respective shafts 67 with corresponding margins horizontally aligned and adjacent each other, and parallel widely spaced corresponding margins at their lower ends to permit the books to drop downwardly.

Figure 10:
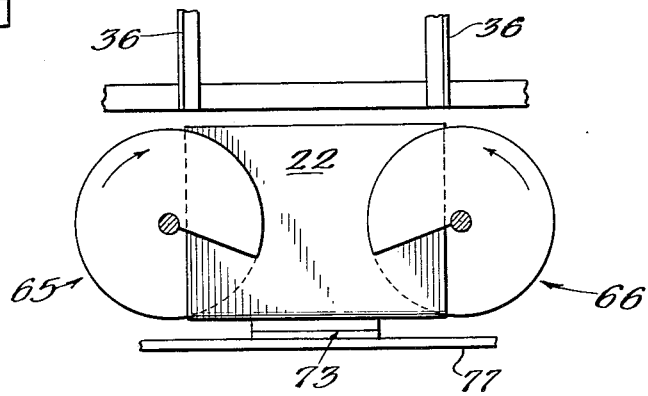
Figure 11:
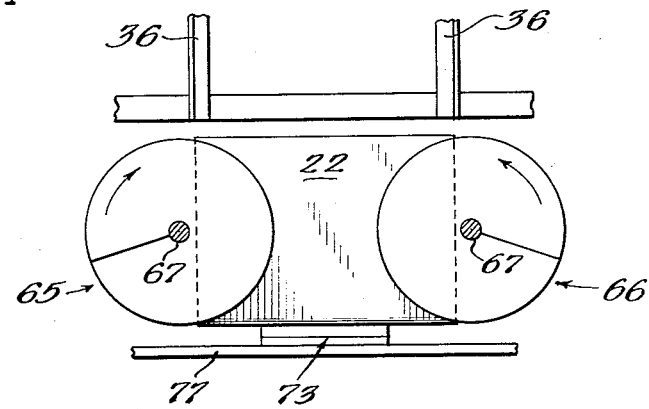

With reference to FIGURES 9-11, each spiral is rotated in an opposite direction so that as a book 22 is horizontally delivered by the friction feed device 21 to the upper portion of the vertical transfer device 24, the bound end 22' of the book engages a vertical cushioned abutment 73 providing stop means for retarding horizontal movement of the books while the books are being moved from the upper portion of the transfer device and discharged from the lower portion thereof, with the book received on corresponding upper adjacent portions of the webs of spirals 65 and 66. Upon rotation of the spirals in opposite directions, as indicated by the arrows in FIGURES 9-11, the bound edge 22' of the book is continuously urged against the abutment 73 and the book is moved downwardly by the spirals.

The spirals 65 and 66 are mounted for rotation on their respective upright axes for receiving the books on the respective webs, by the shafts 67 having opposite portions suitably rotatably journalled, respectively, in an upper leg 74 and a lower leg 75 of a U-shaped base 76. The U-shaped base 76 is mounted in a fixed main frame 77 having a top plate 78 and a pair of bottom plates 79 each fixed to an opposite side plate 80. Each lower leg 75 of the U-shaped base 76 is slidably supported on one of the bottom plates 79 and is snugly received between the respective bottom plate and the top plate 78. Each spiral shaft 67 extends upwardly through a notch 80 in the top plate 78.

Means are provided for varying the spacing between the spirals so that the webs 68 and 69 may receive books of different sizes on radially extending marginal portions thereof, and include the mounting of the spirals in the respective U-shaped bases 76 and a screw mechanism for moving the U-shaped bases on the main frame 77. The screw mechanism includes a main threaded shaft 81 rotatably mounted on side plates 80 of the main frame 77 and secured against longitudinal movement. The shaft 81 has a threaded connection 83 with the upper portion of each U-shaped base 76. A pair of threaded stub shafts 84 are respectively rotatably mounted on the main frame side members 80 and secured against longitudinal movement, and have a threaded connection 85 with the lower portion of the respective U-shaped base 76. Each threaded stub shaft 84 has a sporcket 86 fixed thereto and is connected by a chain drive 87 with a similar sprocket 88 fixed to the adjacent end of the main threaded shaft 81 so that by applying a suitable crank to an extension 90 on the main threaded shaft 81, the shafts may be rotated for simultaneously moving both spirals toward or away from each other. The U-shaped bases 76 are each locked in adjusted position by means of a plate 91 suitably fixed to the top leg 74 of the U-shaped base 76 as by bolts 92, and by locking bolts 93 threadedly received in the top plate 78 of the main frame 77 and passing through slots 94 in the plate 91, and by a second plate 95 suitably fixed to the bottom plate 79 of the main frame 77 as by bolts, and with a locking bolt 96 passing through a slot 97 in the plate 95 and threadedly received in the lower leg 75 of the U-shaped base 76. The locking bolts are loosened for adjusting the spacing between the spirals.

Means for synchronously rotating the spirals in opposite directions on their respective axes to move the books downwardly is provided in the form of a chain drive assembly 100 including a sprocket 101 fixed to the upper end of the shaft 67 of spiral 65, and an identical sprocket 102 fixed to the upper end of the shaft 67 of the spiral 66. A chain 103 has opposite sides engaging the sprockets 101 and 102 with a drive sprocket 104 fixed to a shaft 105 which is suitably connected with a gear box 106 and driven through a clutch mechanism 107 by a chain drive 108 connected with a suitable source of power such as an electric motor (not shown). A pair of tensioning sprockets 110 are each journalled on respective arms 111 adjustably mounted on a boss 112 and fixed in adjusted position by any suitable means as by set screws. The vertical abutment 73 cushions the impact of the books 22 and is mounted on the main frame 77. The abutment extends below the lower open end of the spirals so that the book falls directly downwardly upon being discharged from the spirals. The cushioned abutment includes a smooth metal face plate 115 for facilitating free sliding downward movement of the bound edge 22' as each book 22 is moved downwardly by the spirals. The metal plate 115 is bonded to a resilient cushioning pad 116 which is in turn bonded to a mounting plate 117 attached to the frame 77 in any suitable manner as by bolts. A pair of guide bars 120 are pivotally mounted at one end 121 to the main frame 77 and at the opposite end 122 to an adjusting rod 123 which is slidably mounted in a suitable fitting 124 secured to the top plate 78 of the main frame 77, for clamping the rod 123 in adjusted position to vary the inclination of the guide bars 120, for properly directing books 22 onto the webs 68 and 69 and into engagement with the vertical abutment 73. Downwardly extending aprons 126 are secured to inner edges of the lower legs 75 of the U-shaped base 76 for restraining any books which might move sideways out of the spirals, and to retard currents of air from affecting the normal downward movement of the books as they are discharged from the spirals.

The receiving device 25 provides receiving means for the books 22 as they are delivered directly downwardly from the spirals 65 and 66. The receiving device is in the form of a conveyor mechanism 26 having a suitable conveyor belt or tape 128 which co-operates with a bed 129 for receiving the books 22. The speed of the conveyor belt 128 may be varied to suit various circumstances but it should be operated relatively slowly and at a lower lineal rate than the infeed mechanism, so that the books 22 may fall in place in shingled relationship and without oversliding each other.

Figure 12:
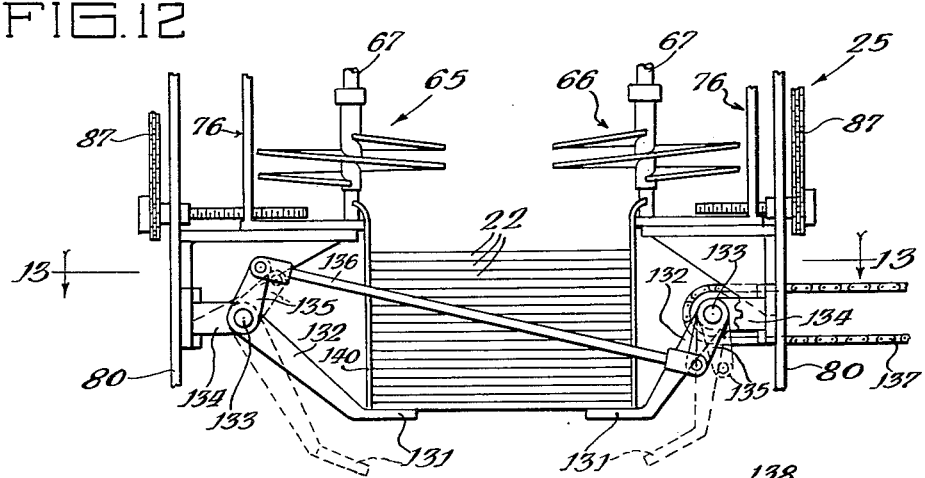
FIGURE 12 is a rear elevational view of another embodiment of a receiving device.
Figure 13:
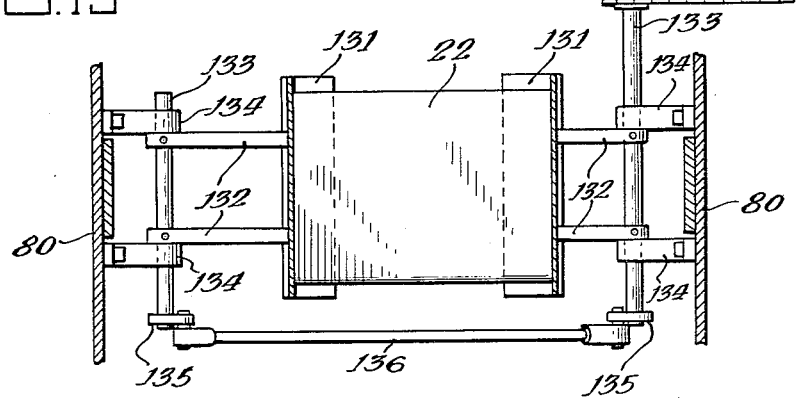
FIGURE 13 is a section taken substantially as illustrated along the line 13—13 in FIGURE 12.
Figure 14:
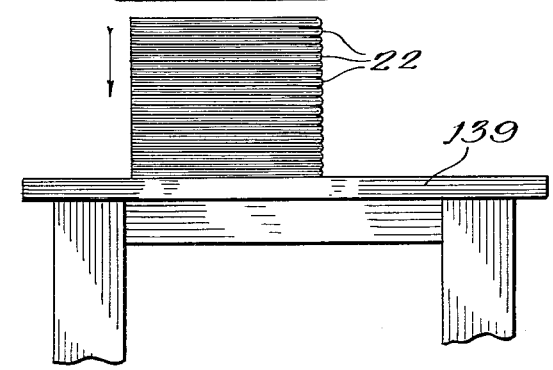
FIGURE 14 is a fragmentary side elevational view taken in the direction of the arrow of FIGURE 13, and illustrating the receiving device discharging a stack of books.

FIGURES 12-14 illustrate another embodiment of a receiving device providing receiving means wherein the spirals 65 and 66 deliver the books 22 directly downwardly, forming a stack of books received on retractable supporting means in the form of plates 131 on the ends of arms 132 respectively fixed to shafts 133 which are journalled in suitable supports 134 secured to the side plates 82 of the main frame 77. Also fixed to the shafts 133 are a pair of arms 135 pivotally interconnected at their free end by a tie bar 136. A suitable actuating mechanism 137, such as a chain drive engaging a sprocket wheel 138 fixed to an outer end of one of the shafts 133, is provided for rotating the shafts in opposite directions through the tie bar 136 and moving the plates 131 outwardly to permit the stack of books 22 to drop downwardly onto a suitable receiver such as a table 139, or into containers such as mail sacks. Side guides 140 hold the books in vertical alignment as they fall off the webs.

The foregoing detailed description is given for clearness of understanding only and no unnecessary limitations are to be understood therefrom, as some modifications will be obvious to those skilled in the art.

I claim:

1. Book transfer apparatus comprising: a single pair of upright, rotatable shafts; means for rotating said shafts in opposite directions; a book supporting web extending radially from each shaft, said webs having coplanar portions to cooperatively support a book in a horizontal position, and said webs having margins which are parallel at one point in the rotation of the shafts so as to drop a horizontally positioned book vertically from the webs; infeed means for moving horizontally positioned books generally horizontally and including feed rollers which project said books free of said rollers and seriatim between said shafts and onto said webs; stop means on the opposite sides of said shafts from said rollers, and immediately adjacent said webs, against which the leading ends of books projected solely by said feed rollers onto and across the webs abut to arrest the horizontal movement of the books; book guide means associated with the infeed means and the stop means; and book receiving means between the shafts and below the webs.

2. The apparatus of claim 1 in which the book supporting webs are helices of equal and opposite pitch, whereby rotation of the shafts lowers the books on the helices, and the lower ends of the helices constitute said margins.

3. The apparatus of claim 2 in which each helix extends twice around the shaft on which it is mounted, and the upper ends of the helices overlie said lower ends.

4. The apparatus of claim 1 in which the book receiving means includes endless conveyor tapes and means for driving said tapes at a slower linear rate than the infeed means, whereby the books are carried away from the transfer apparatus in shingled relationship.

5. The apparatus of claim 1 in which the book receiving means includes side guides to hold the ends of the books in vertical alignment as they drop off the webs, and retractable book supporting means to permit removal of a stack of books from the receiving means.

6. The apparatus of claim 1 in which the feed rollers comprise book supporting friction rollers, upper friction rollers overlying books on said supporting rollers, and means urging said upper rollers against books on the supporting rollers.

7. The apparatus of claim 6 in which the book guide means includes hold down bars, and means urging said bars tightly against the trailing portions of books as the latter abut the stop means.

References Cited in the file of this patent

UNITED STATES PATENTS

| | | |
|---|---|---|
| 1,273,796 | Bleile | July 23, 1918 |
| 1,365,741 | Speer | Jan. 18, 1921 |
| 1,663,288 | Ulrich | Mar. 20, 1928 |
| 1,791,569 | Novick | Feb. 10, 1931 |
| 1,883,795 | Kannee | Oct. 18, 1932 |
| 2,472,225 | Muddiman | June 7, 1949 |